United States Patent [19]

Patel et al.

[11] Patent Number: 5,758,117
[45] Date of Patent: May 26, 1998

[54] METHOD AND SYSTEM FOR EFFICIENTLY UTILIZING RENAME BUFFERS TO REDUCE DISPATCH UNIT STALLS IN A SUPERSCALAR PROCESSOR

[75] Inventors: Rajesh Bhikhubhai Patel; Soummya Mallick, both of Austin, Tex.

[73] Assignee: International Business Machines Corporation, Armonk, N.Y.

[21] Appl. No.: 572,458

[22] Filed: Dec. 14, 1995

[51] Int. Cl.$^6$ .................................................. G06F 9/38
[52] U.S. Cl. ................................. 395/393; 395/395
[58] Field of Search ........................ 395/393, 392, 395/394, 395, 800

[56] References Cited

U.S. PATENT DOCUMENTS

| | | | |
|---|---|---|---|
| 4,574,349 | 3/1986 | Rechtschaffen | 364/200 |
| 4,623,962 | 11/1986 | Matsumoto et al. | 395/800 |
| 5,261,062 | 11/1993 | Sato | 395/705 |
| 5,280,615 | 1/1994 | Church et al. | 395/650 |
| 5,293,631 | 3/1994 | Rau et al. | 395/707 |
| 5,303,358 | 4/1994 | Baum | 395/375 |
| 5,386,562 | 1/1995 | Jain et al. | 395/650 |
| 5,546,554 | 8/1996 | Yung et al. | 395/413 |
| 5,564,031 | 10/1996 | Amerson et al. | 345/419 |
| 5,590,295 | 12/1996 | Deosaran et al. | 395/393 |

OTHER PUBLICATIONS

IBM Technical Disclosure Bulletin, vol. 32 No. 8B, Jan. 1990; pp. 4–5.
IBM Technical Disclosure Bulletin, vol. 37 No. 10, Oct. 1994; pp. 143–145.

*Primary Examiner*—Krisna Lim
*Assistant Examiner*—Viet Vu
*Attorney, Agent, or Firm*—Michael A. Davis, Jr.; Sawyer & Associates

[57] ABSTRACT

A method for reducing dispatch stalls includes tracking allocation and deallocation of real rename buffers for instructions dispatched by a dispatch unit, and providing at least one virtual rename buffer for allocation of an instruction when the real rename buffers have been allocated. The method further includes tagging the instruction allocated to the at least one virtual rename buffer with a rename buffer busy signal, wherein the rename buffer busy signal indicates to an execution unit that the instruction cannot be completed. An efficient system for utilization of rename buffers in a superscalar processor includes a plurality of rename buffers, a dispatch unit coupled to the plurality of rename buffers, and an allocation/deallocation table coupled to the dispatch unit and the plurality of rename buffers. Further, the table includes a plurality of real rename buffer slots and at least one virtual rename buffer slot. Additionally, a rename busy signal is provided for an instruction allocated to the at least one virtual rename buffer slot.

10 Claims, 6 Drawing Sheets

| IDN | GPRs | RENAME | VALID |
|---|---|---|---|
| | | | |
| | | | |
| | | | |
| | | | |
| | | | |
| | | | |

FIG. 2

METHOD AND SYSTEM FOR EFFICIENTLY UTILIZING RENAME BUFFERS TO REDUCE DISPATCH UNIT STALLS IN A SUPERSCALAR PROCESSOR

FIELD OF THE INVENTION

The present invention relates to superscalar processors, and more particularly to increased, efficient utilization of rename buffers in a superscalar processor.

BACKGROUND OF THE INVENTION

In the continuing development of faster and more powerful computer systems, a significant microprocessor has been utilized, known as a reduced instruction set computer (RISC) processor. Increased advances in the field of RISC processors have led to the development of superscalar processors. Superscalar processors, as their name implies, perform functions not commonly found in traditional scalar microprocessors. Included in these functions is the ability to execute instructions out-of-order with respect to the program order. Although the instructions occur out-of-order, the results of the executions appear to have occurred in program order, so that proper data coherency is maintained.

Typical components included in a superscalar processor to support out-of-order execution are rename buffers. As their name implies, rename buffers allow a dispatch unit to rename memory buffers so that a location, such as a general purpose register, to which execution units, such as fixed point units, cannot write results, can be assigned rename value locations for an operand/result. Unfortunately, processor systems are limited in the number of rename buffers they include. Thus, decreased performance may result when all the rename buffers of a system are busy, but not all of the execution units are busy. In such situations, the dispatch unit does not dispatch instructions, i.e., the dispatch unit stalls, since no rename buffers are available, even though an execution unit could suitably perform functional operations on an instruction.

Accordingly, a need exists for a system that efficiently and effectively combats such problems and decreases the number of dispatch unit stalls due to the lack of rename buffers to enhance overall processor performance.

SUMMARY OF THE INVENTION

Accordingly, the present invention meets these needs and provides a method and system for reducing dispatch stalls and for efficiently utilizing rename buffers in a superscalar processor. In a method aspect, reducing dispatch stalls includes tracking allocation and deallocation of real rename buffers for instructions dispatched by a dispatch unit, and providing at least one virtual rename buffer for allocation of an instruction when the real rename buffers have been allocated. The method further includes tagging the instruction allocated to the at least one virtual rename buffer with a rename buffer busy signal, wherein the rename buffer busy signal indicates to an execution unit of the processor that the instruction cannot be completed.

In a system aspect, efficient utilization of rename buffers in a superscalar processor includes a plurality of rename buffers, a dispatch unit coupled to the plurality of rename buffers, and an allocation/deallocation table coupled to the dispatch unit and the plurality of rename buffers. Further, the table includes a plurality of real rename buffer slots and at least one virtual rename buffer slot. Additionally, a rename busy signal is provided via the table for an instruction allocated to the at least one virtual rename buffer slot.

The present invention provides a straightforward and efficient system for improving performance in a superscalar processor. Such efficiency results from effectively controlling the use of virtual rename buffers in conjunction with real rename buffers. Through proper utilization in accordance with the present invention, virtual rename buffers allow dispatches to execution units to continue even after all of the real rename buffers have been allocated. Thus, processor performance is improved by reducing the number of stalls in a dispatch unit due to a lack of real rename buffers.

These and other advantages of the aspects of the present invention will be more fully understood in conjunction with the following detailed description and accompanying drawings.

BRIEF DESCRIPTION OF THE DRAWINGS

FIG. 2 illustrates an example of a prior art allocation/deallocation table.

DETAILED DESCRIPTION

The present invention relates to utilization of virtual rename buffers in a superscalar processor to reduce dispatch stalls. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
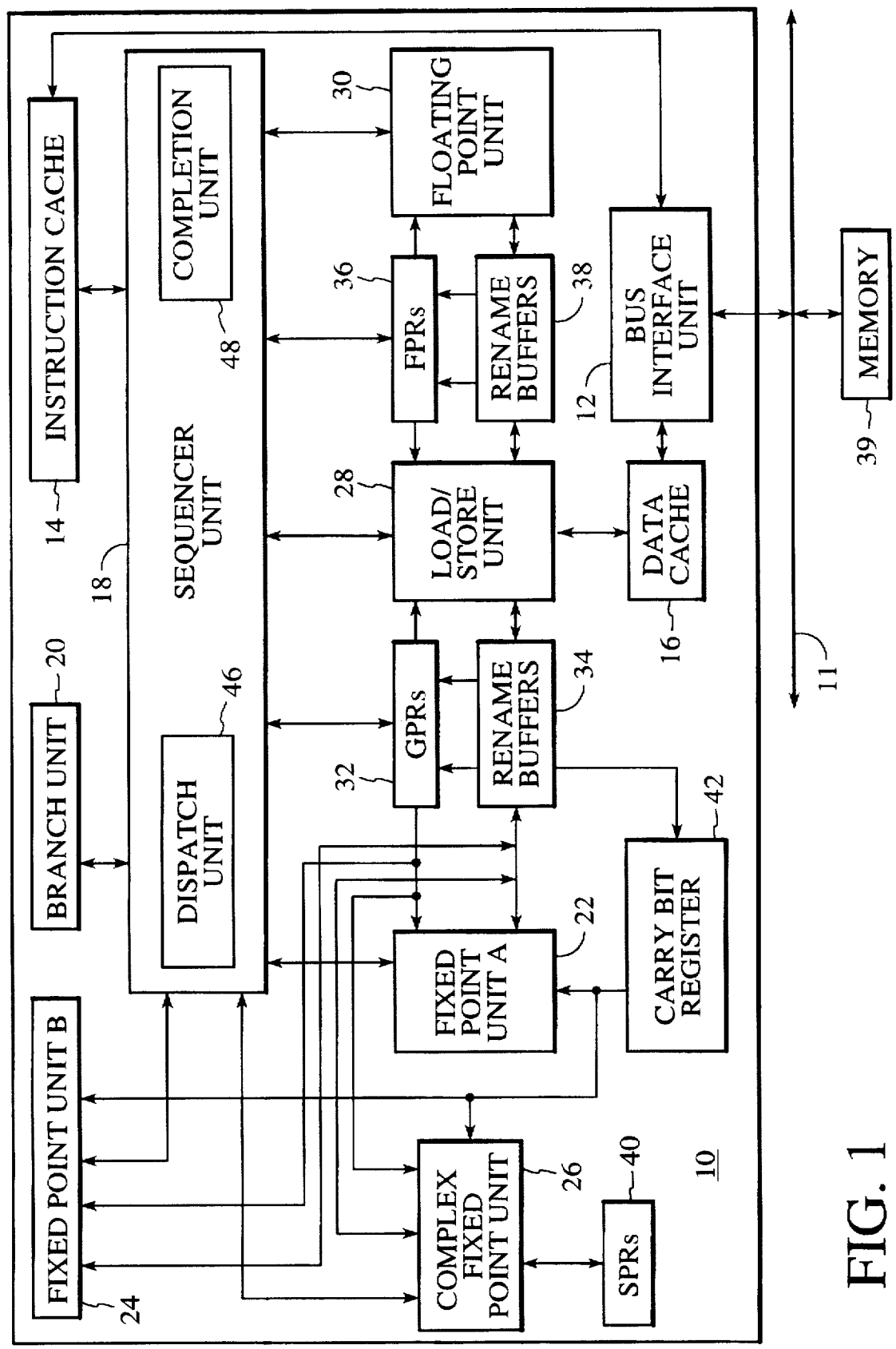
FIG. 1 illustrates a block diagram of a computer system in accordance with the present invention.

FIG. 1 is a block diagram of a processor system 10 for processing information in accordance with the present invention. In the preferred embodiment, processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, completion, and writeback.

In the preferred embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16 or memory.

As an example of the interaction among the execution units, e.g., FXUA 22, FXUB 24, rename buffers 34, and the dispatch unit 46, an instruction "add c,a,b" is dispatched from the dispatch unit 46 to the FXUA 22. The dispatch unit 46 provides the FXUA 22 with tags for the operands "a" and "b" to tell the FXUA 22 where to retrieve the data for the operands, as is well understood by those skilled in the art. For example, in a system with six rename buffers, the dispatch unit 46 might suitably tag the operand for "a" as being located in a rename buffer 1 with a six bit tag 100000. A tag of 010000 might then suitably be used to indicate that the operand "b" is in the rename buffer 2. Since the FXUA 22 does not write into GPRs 32, the dispatch unit 46 must use a rename buffer tag for the target of the operation, such as 001000, for the result of the 'add' instruction to be placed in rename buffer 3.

Figure 2:
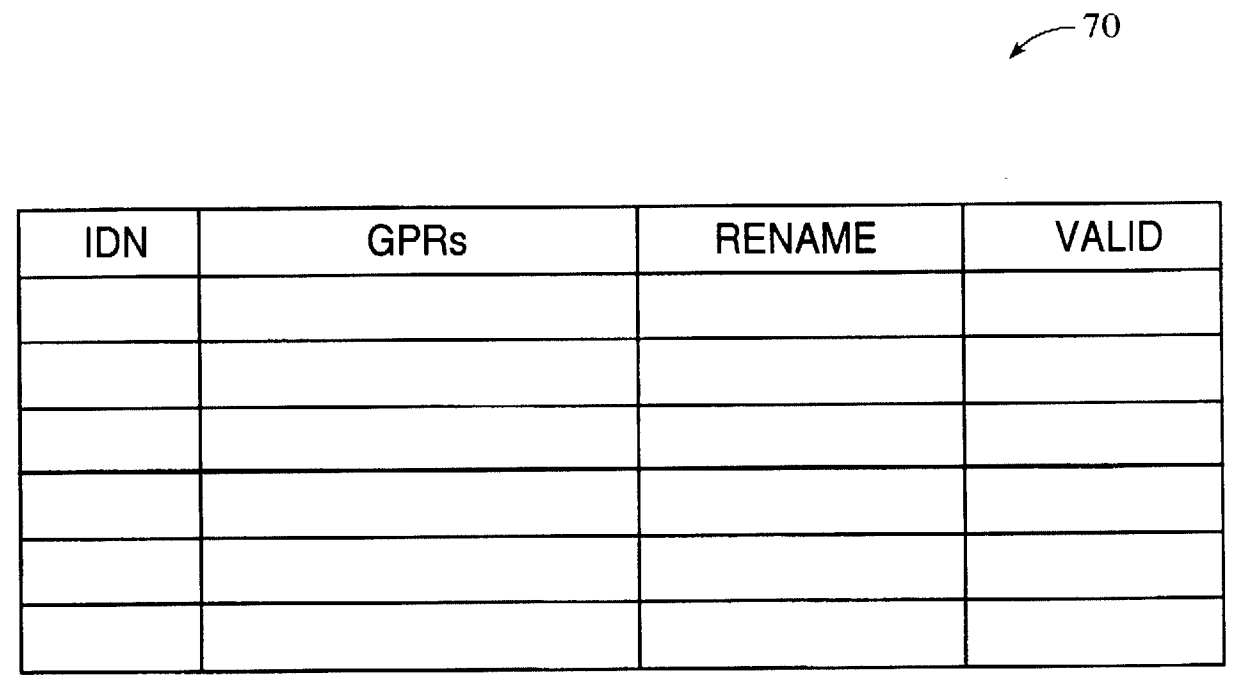

Since the dispatch unit 46 suitably employs rename buffers 34 and 38 to identify the location of the operands and results of operations, an allocation/deallocation table is preferably employed to track which buffers have been renamed. For example, FIG. 2 illustrates a suitable allocation/deallocation table 70, stored in the processor, for a superscalar processor system having, as a representation, six rename buffers. By way of example, the table 70 includes six slots, one for each rename buffer, with each slot including fields for the instruction identifier (IDN), GPR identifier (GPRs), rename register identifier (Rename) and a valid field (Valid). With the use of the rename buffer table 70, the dispatch unit 46 can accurately keep track of which rename buffers have been used and which are available. Also, the relationship between the GPRs with the rename buffers is maintained in order to identify which register or rename buffer has the appropriate data for subsequent instructions.

Typically, the dispatch unit 46 stops allocating rename buffers 34 once all of the rename buffers 34 have been allocated. Unfortunately, execution units may be idle while all of the rename buffers 34 are full Thus, potential instructions for execution by idle execution units are delayed due to the lack of dispatching by the dispatch unit 46.

Figure 3:
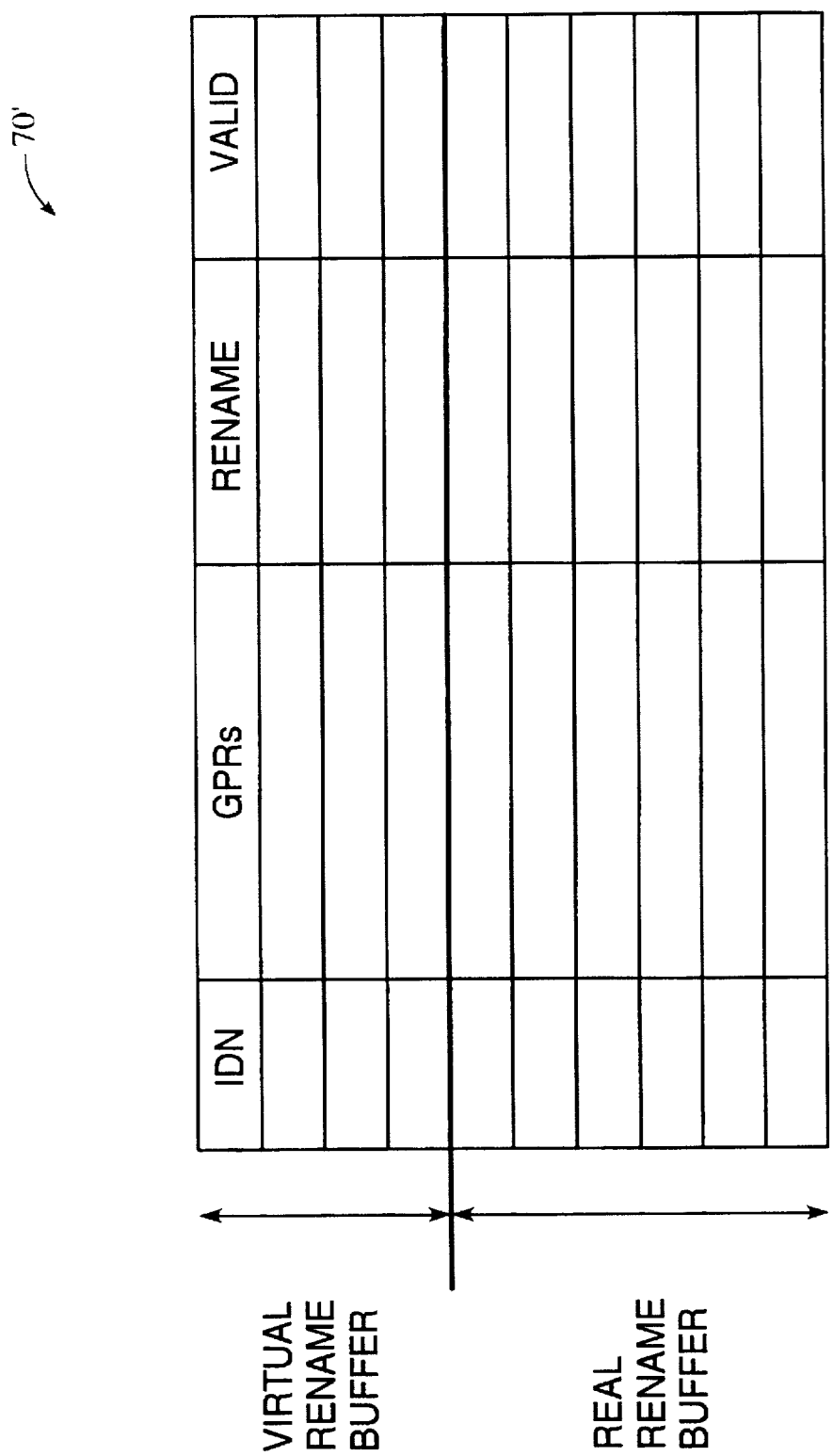
FIGS. 3-5 illustrate an allocation/deallocation table including virtual rename buffers in accordance with the present invention.

Accordingly the present invention provides a method and system for allowing dispatch of instructions to execution units when all of the rename buffers of a system are in use. As shown in FIG. 3, extra slots for virtual rename buffers are added to form an allocation/deallocation table 70'. With the addition of the data for these slots in the allocation/deallocation table 70', stalls in the dispatch unit due to a lack of an available rename buffer are significantly reduced.

Figure 4:
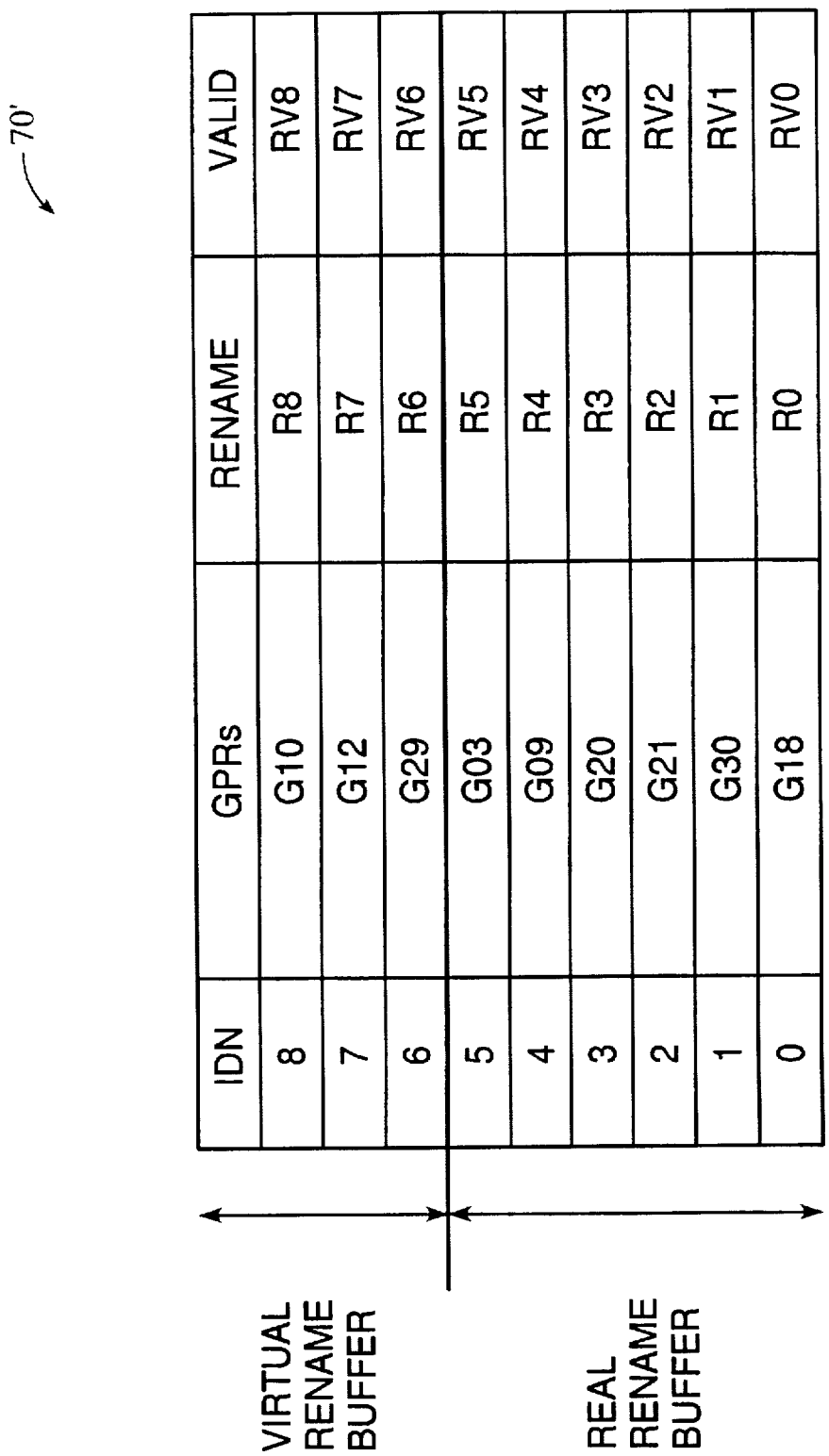
Figure 5:
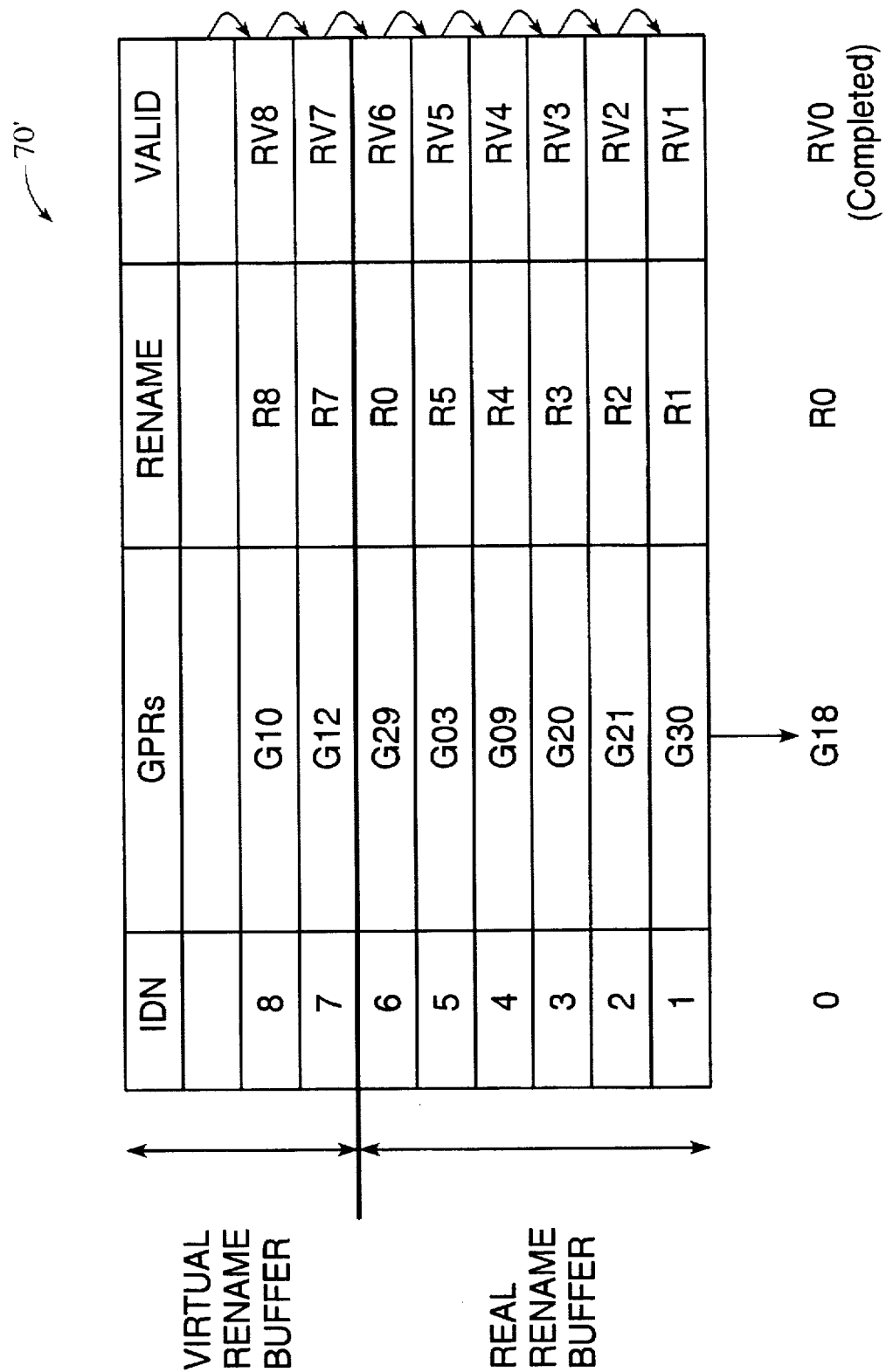

By way of example, FIGS. 4 and 5 illustrate how the table 70' is utilized in accordance with the present invention. As shown in FIG. 4, each dispatched instruction is loaded into a real rename buffer if there is an empty slot available in the real rename buffer portion of the table. Suppose, for example, that an instruction with identifier 0 (IDN 0) comprises a 1 wzx G18, OP1, OP2 (load word and zero indexed, which adds the operands, OP1 and OP2, to produce the effective address for loading a word from memory into the location of a target register, GPR 18). Since the table in initially empty and no other real rename buffers have been assigned, G18 is renamed as rename buffer 0, R0. Thus, the target tag for the instruction suitably is represented by a 100000 bit sequence. However, in accordance with the present invention, an additional bit, a rename busy bit, would also be included in the target tag.

Figure 6:
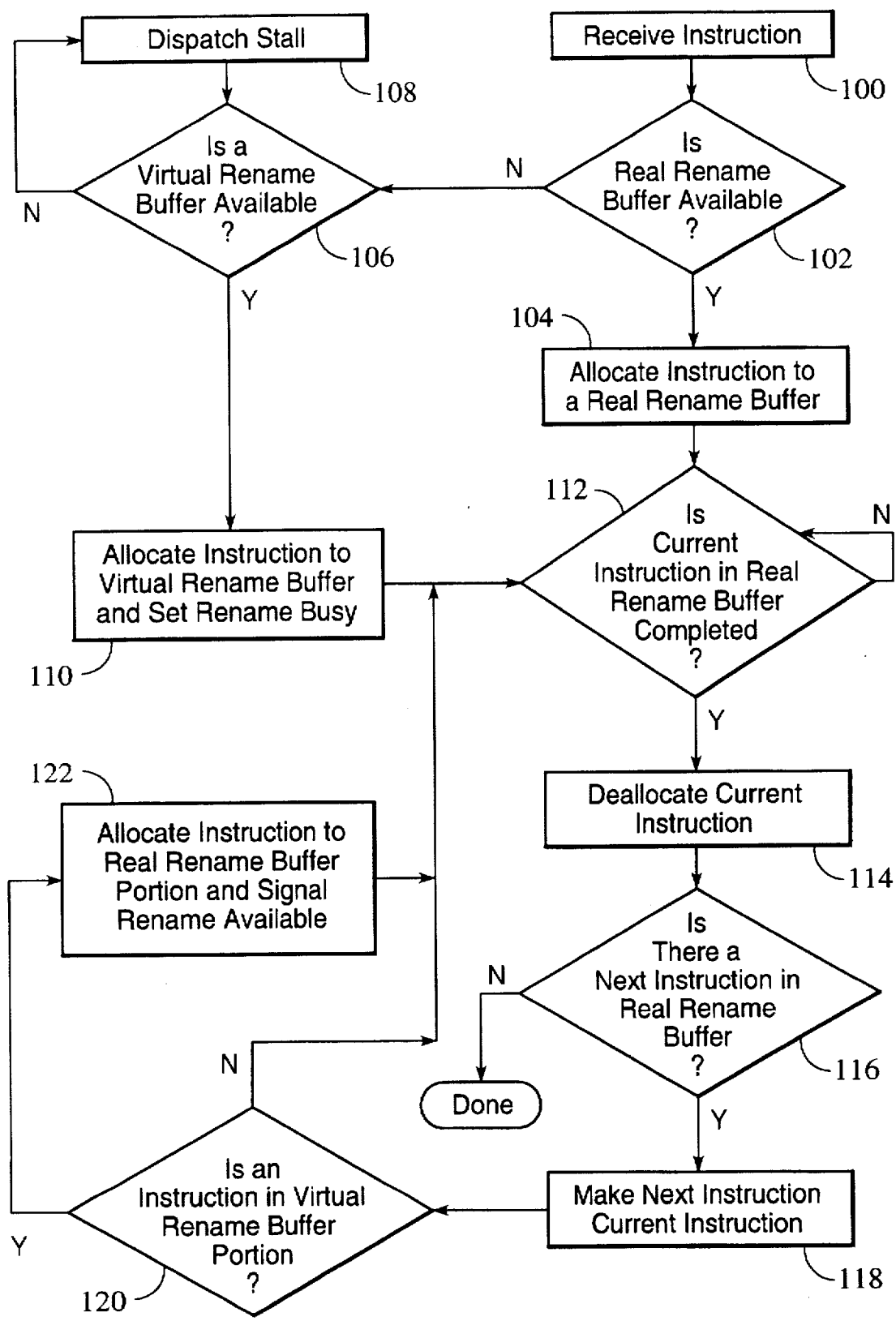
FIG. 6 illustrates a block, flow diagram of allocation/deallocation including virtual rename buffers in accordance with the present invention.

Using the data shown in FIG. 4, once the real rename buffers were all allocated, a next instruction, i.e., instruction 6 (IDN 6), would be assigned to a virtual rename buffer slot, e.g., virtual rename buffer 6, R6. In a preferred embodiment, the virtual rename buffers do not physically exist but are assigned to the instructions so that the instructions can be dispatched to the appropriate execution units if there are no operand conflicts. Since the instruction has been allocated a virtual rename buffer, the rename busy bit for the instruction is set. Thus, a suitable representation of the bit tag sequence for IDN 6 comprises 1100000, with the most significant bit representing the set rename busy bit. The execution units thus recognize the set value for the rename busy bit and determine that the instruction can be operated upon but not finished until the rename busy bit is reset FIG. 5 illustrates how the rename busy bit for an instruction becomes reset As shown, once an instruction, i.e., instruction 0, is completed, it is deallocated from the table 70'. At this point, a real rename buffer, R0, is available for use by the first instruction entry in the virtual rename buffer portion of the table, i.e., IDN 6. The instruction IDN 6 is then placed into the real rename buffer portion of the table. In conjunction, a rename available signal is asserted to inform the appropriate execution unit that the rename buffer for the instruction is now a real rename buffer. A search for the appropriate IDN, e.g., IDN 6, among the execution units suitably provides the rename available signal to the proper execution unit FIG. 6 presents a flow diagram illustrating the allocation/deallocation of rename buffers including virtual rename buffers in accordance with the present invention. When an instruction is received, via step 100, a determination is made as to whether any real rename buffers are available for allocation of the instruction, via step 102. If there is a real rename buffer available, the instruction gets allocated to the real rename buffer via step 104. If there is no real rename buffer available, i.e., the real rename buffer portion of table 70' is full a determination is made via step 106 as to whether a virtual rename buffer is available. If no virtual rename buffer is available, the dispatch unit stalls via step 108 until a virtual rename buffer is available. When a virtual rename buffer is available, the virtual rename buffer is allocated to the instruction, and the rename busy signal for the instruction is set via step 110.

A determination is then made via step 112 as to whether a current instruction in the real rename buffer portion of the allocation/deallocation 70' has completed. When completed, the current instruction is deallocated from the real rename buffer portion of table 70', via step 114. A determination is then made, via step 116, as to whether there is a next instruction allocated in the real rename buffer portion. If so, the next instruction becomes the current instruction, via step 118. The process continues with a determination of whether there is an instruction in a virtual rename buffer via step 120.

When there is an instruction allocated to a virtual rename buffer, i.e., step 120 is positive, the instruction is deallocated from the virtual rename portion and allocated via step 122, to the real rename buffer, which had been deallocated from the completed current instruction in step 114. The rename available signal is also transmitted to the appropriate execution unit via step 122 when the instruction is allocated the real rename buffer portion, and the process continues, via step 112. If step 120 is negative, and no instructions are in the virtual rename buffer portion, the process returns to step 112. When there are no next instructions, as determined via step 116, the process is completed.

Thus, overall operation of the use of the table 70' proceeds as summarized below. Instructions are loaded into the real rename buffer portion of the table 70' if there in an empty slot available. Each instruction is completed out of the real rename buffer. An instruction is loaded into the virtual rename buffer portion when all of the real rename buffer slots are filled. When the virtual rename buffer portion is also full, the problem of dispatch stalling occurs, but, the number of slots in the virtual rename buffer portion of the table can be increased rather inexpensively to combat such problems. The rename busy bit is set for each valid instruction in the virtual rename buffer portion. Each instruction in the virtual rename buffer portion is loaded into the real rename buffer portion upon completion of an instruction in the real rename buffer portion. Once loaded into the real rename buffer portion, a rename available signal is asserted to notify the particular execution unit that the real rename buffer is now valid for the instruction, and the instruction can be finished, since it has been allocated a real rename buffer for its target operand.

Although the present invention has been described in accordance with the embodiments shown, one of ordinary skill in the art will recognize that there could be variations to the embodiment and those variations would be within the spirit and scope of the present invention. For example, although the rename busy bit has been identified as one bit, a plurality of bits may be used as desired without departing from the present invention. Further, although the examples have used a particular number of rename buffers and virtual rename buffers, the numbers chosen have been used for illustrative purposes and are not meant as restrictive of the present invention. Accordingly, many modifications may be made by one of ordinary skill without departing from the spirit and scope of the present invention, the scope of which is defined by the following claims.

We claim:

1. A method for reducing stalls in a dispatch unit of a superscalar processor, the processor further including a plurality of rename buffers coupled to the dispatch unit, the method comprising:

tracking allocation and deallocation of real rename buffers for instructions dispatched by the dispatch unit;

providing at least one virtual rename buffer for allocation of an instruction when the real rename buffers have been allocated; and tagging the instruction allocated to the at least one virtual rename buffer with a rename buffer busy signal, wherein the rename buffer busy signal indicates to an execution unit of the processor that the instruction cannot be completed.

2. The method of claim 1 wherein when an instruction completes and is deallocated from the real rename buffers, the instruction in the at least one virtual rename buffer is allocated a real rename buffer.

3. The method of claim 2 wherein the real rename buffer allocated is the real rename buffer deallocated from the completed instruction.

4. The method of claim 2 further comprising providing a rename available signal to the execution unit when the instruction in the at least one virtual rename buffer is allocated to the real rename buffer.

5. The method of claim 4 wherein when the rename available signal is received, the instruction is capable of being completed.

6. A system for efficiently utilizing rename buffers in a superscalar processor, the system comprising:

a plurality of rename buffers;

a dispatch unit coupled to the plurality of rename buffers; and an allocation/deallocation table coupled to the dispatch unit and the plurality of rename buffers, the table comprising a plurality of real rename buffer slots and at least one virtual rename buffer slot, and providing a rename busy signal for an instruction allocated to the at least one virtual rename buffer slot.

7. The system of claim 6 wherein when the system allocates an instruction to the at least one virtual rename buffer slot, the dispatch unit dispatches the instruction to an execution unit.

8. The system of claim 7 wherein the execution unit operates on the instruction.

9. The system of claim 8 wherein when the table allocates the instruction to a real rename buffer, the system signals a rename available signal to the execution unit.

10. The system of claim 9 wherein the execution unit completes the instruction once the rename available signal is received.

* * * * *